US010345135B2

(12) United States Patent
Tokarev et al.

(10) Patent No.: US 10,345,135 B2
(45) Date of Patent: Jul. 9, 2019

(54) METHOD FOR CONTROLLING THE LIQUID LEVEL IN TANKS AS PER CHARACTERISTICS OF LAMB WAVES AND DEVICE FOR ULTRASONIC CONTROL OF THE LIQUID LEVEL IN TANKS

(71) Applicant: OBSCHESTVO S OGRANICHENNOI OTVETSTVENNOSTYU "NAUCHNO-ISSLEDOVATELSKY TSENTR TEKHNOAVTOMAT" (OOO "NITS TEKHNOAVTOMAT"), Engels, Saratovskaya obl. (RU)

(72) Inventors: Vyacheslav Grigorevich Tokarev, Engels (RU); Oleg Mihaylovich Kachanov, Engels (RU); Anton Ivanovich Kurenkov, Engels (RU); Andrei Vladimirovich Romanov, Engels (RU); Dmitry Viktorovich Aristov, Engels (RU)

(73) Assignee: OBSCHESTVO S OGRANICHENNOI OTVETSTVENNOSTYU "NAUCHNO-ISSLEDOVATELSKY TSENTR TEKHNOAVTOMAT" (OOO "NITS TEKHNOAVTOMAT"), Engels (RU)

( * ) Notice: Subject to any disclaimer, the term of this patent is extended or adjusted under 35 U.S.C. 154(b) by 98 days.

(21) Appl. No.: 15/563,352
(22) PCT Filed: Jul. 22, 2016
(86) PCT No.: PCT/RU2016/000470
§ 371 (c)(1),
(2) Date: Sep. 29, 2017
(87) PCT Pub. No.: WO2017/023191
PCT Pub. Date: Feb. 9, 2017

(65) Prior Publication Data
US 2018/0080809 A1 Mar. 22, 2018

(30) Foreign Application Priority Data

Jul. 31, 2015 (RU) ................................ 2015131984

(51) Int. Cl.
*E21B 47/16* (2006.01)
*G01F 23/296* (2006.01)
*G01F 25/00* (2006.01)

(52) U.S. Cl.
CPC ...... *G01F 23/2965* (2013.01); *G01F 25/0061* (2013.01)

(58) Field of Classification Search
None
See application file for complete search history.

(56) References Cited

U.S. PATENT DOCUMENTS

| 4,316,183 A * | 2/1982 | Palmer | G01F 23/2965 340/621 |
| 4,896,535 A * | 1/1990 | Duckart | G01F 23/296 181/0.5 |

(Continued)

FOREIGN PATENT DOCUMENTS

| EP | 0332534 A1 * | 9/1989 | ......... G01F 23/2961 |
| EP | 3115753 A1 * | 1/2017 | ........... G01N 29/222 |

(Continued)

OTHER PUBLICATIONS

International Search Resort issued in PCT/RU2016/000470 dated Dec. 15, 2016.

(Continued)

*Primary Examiner* — Isam A Alsomiri
*Assistant Examiner* — Jonathan D Armstrong
(74) *Attorney, Agent, or Firm* — Nixon & Vanderhye P.C.

(57) ABSTRACT

The present method makes use of a second receiver-transmitter pair, which, together with a first pair, forms a quadrilateral figure, the horizontal sides of which are parallel to (Continued)

the level of a liquid. In addition, the values of the energy characteristics of Lamb waves propagated simultaneously both between each of the horizontal receiver-transmitter pairs and between a second vertical receiver-transmitter pair are calculated using values obtained from certain horizontal pairs to determine the initial and final values of the measuring scale of other pairs, by means of which the height of the liquid level is determined and/or measured. The device comprises an acoustic receiver and an emitter, each provided with a piezoelectric transducer, which are mounted at a set distance from one another such that a liquid level monitoring region lies therebetween for the simultaneous excitation of a symmetrical and an antisymmetric normal zero mode Lame wave, the device further comprising a second acoustic receiver-transmitter pair and a signal generating and converting unit. Technical result: increased monitoring accuracy together with increased monitoring speed and a broader scope of application.

4 Claims, 3 Drawing Sheets

(56) References Cited

U.S. PATENT DOCUMENTS

| | | | |
|---|---|---|---|
| 4,954,997 A | 9/1990 | Dieulesaint et al. | |
| 5,015,995 A * | 5/1991 | Holroyd | G01F 23/28 340/617 |
| 5,456,114 A * | 10/1995 | Liu | B64D 15/20 73/290 V |
| 2005/0178198 A1* | 8/2005 | Freger | G01F 23/28 73/290 V |
| 2006/0090563 A1* | 5/2006 | Austerlitz | G01F 23/2961 73/290 V |
| 2006/0169055 A1* | 8/2006 | Agam | B65D 90/48 73/861.23 |
| 2007/0169549 A1* | 7/2007 | Kwun | G01F 23/2965 73/290 V |
| 2016/0320226 A1* | 11/2016 | Schaefer | G01F 23/2962 |
| 2017/0010143 A1* | 1/2017 | Kassubek | G01N 29/222 |

FOREIGN PATENT DOCUMENTS

| | | | | |
|---|---|---|---|---|
| EP | 3115754 A1 | * | 1/2017 | ......... G01F 25/0061 |
| GB | 2152667 A | * | 8/1985 | ......... G01F 23/2962 |
| GB | 2206965 A | * | 1/1989 | ......... G01F 23/2961 |
| GB | 2427273 A | * | 12/2006 | ......... G01F 23/2965 |
| RU | 2 112 221 | | 5/1998 | |
| RU | 2 123 172 | | 12/1998 | |
| RU | 2 437 066 | | 12/2011 | |
| SU | 343155 | | 6/1972 | |

OTHER PUBLICATIONS

Written Opinion of the International Search Report issued in PCT/RU2016/000470 dated Dec. 15, 2016.

* cited by examiner

METHOD FOR CONTROLLING THE LIQUID LEVEL IN TANKS AS PER CHARACTERISTICS OF LAMB WAVES AND DEVICE FOR ULTRASONIC CONTROL OF THE LIQUID LEVEL IN TANKS

This application is the U.S. national phase of International Application No. PCT/RU2016/000470 filed Jul. 22, 2016 which designated the U.S. and claims priority to Russian Application No. 2015131984 filed Jul. 31, 2015, the entire contents of each of which are hereby incorporated by reference.

FIELD OF THE INVENTION

The proposed group of inventions refers to the technology of controlling the technological parameters of liquid media in tanks for industrial production and can find application in the chemical, oil and gas, food and other industries.

BACKGROUND OF THE INVENTION

A method for ultrasonic control of the level of liquid in tanks is known (USSR certificate of authorship No. 343155, G 01 F 23/28, 1972), in which a longitudinal ultrasonic wave is introduced into the tank wall at an angle to it and parallel to the surface of the monitored medium; the velocity of the trace of this wave on the input surface is set equal to the velocity of a normal wave (Lamb wave) propagating in the wall, and after passing a fixed distance along the wall, the Lamb wave is received and its amplitude is used as an information signal about the liquid level.

The disadvantage of this method of controlling the liquid level, which reduces its reliability and accuracy, is the instability of the amplitude of the information signal when the thickness of the walls in the tank changes due to corrosion or exposure to aggressive media and overgrowing with residual components of the liquid reagents. The instability of the information signal in this method is also caused by changes in the acoustic resistance of the contact layer between the acoustic transducers and the wall of the tank. These changes can be caused by gradual extrusion of the contact layer due to the temperature fluctuations of the external environment and the associated temperature expansion/contraction.

A device is known (USSR copyright certificate No. 343155, G 01 F 23/28, 1972), which implements this level control method in closed tanks, comprising two identical inclined acoustic transducers directed to each other and mounted on the outer surface of the tank at a fixed distance to each other, serially connected exciter and power amplifier. An amplifier, selector cascade (with its first input), detector and measuring cascade are serially connected to one of the acoustic transducers, the serially connected synchronizer, delay unit, strobe-pulse generator; synchronizer is connected to the input of the exciter, and the strobe-pulse generator to the second input of the first selector cascade, which is connected between the amplifier and the detector.

The disadvantage of this device is low reliability and accuracy caused by the dependence of information signals on the influence of destabilizing factors, for example, the changing acoustic resistance of the contact layer between the acoustic sensors and the tank wall. These changes can be caused by gradual extrusion of the contact layer due to the temperature fluctuations of the external environment and the associated temperature expansion/contraction.

A method for controlling the liquid level is known (RF patent No. 2112221, C1, G 01 F 23/296, 1998), which is that the ultrasonic wave is introduced into the tank wall parallel to the surface of the liquid medium, and the ultrasonic wave propagating in a fixed section of the wall is a Lamb wave; simultaneously using the same source, a longitudinal ultrasonic wave is excited in the tank wall, propagating in the plane of the horizontal section of the tank along the chord of the tank circumference through the wall, the monitored liquid medium and the opposite wall. This wave is received by the same receiver in a time zone different from the Lamb wave reception time zone, the amplitude values of the Lamb wave or the longitudinal wave are extracted in each time zone, which are used to form the normalized information signals at a predetermined sensitivity threshold, which are used to manage the intermediate storage device (ISD), at the output of which one signal is received on the presence of two or at least one of the normalized information signals at the input of the ISD during the period of exciting pulses flow, which are used to judge on the presence of the liquid at a controlled level in the tank.

A disadvantage of the second method for liquid level control is the insufficient reliability due to the fact that the paths and propagation velocities of the longitudinal wave and the Lamb wave are different, so the time interval for their reception can coincide (overlap) with the reception of reflected signals propagated in the tank wall. Besides, the amplitude instability of its signal is due to the non-stable properties of the liquid, the level of which is controlled, for example, by the compressibility $\beta$, on which the speed of sound depends. Compressibility, in turn, depends on the temperature, and the nature of this dependence varies from liquid to liquid.

A method for controlling the liquid level is known (RF patent No. 2123172, C1, G 01 F 23/296, 1998). In this method, as well as in the first one, a longitudinal ultrasonic wave is introduced into the wall of the tank at an angle to it, but parallel to the surface of the monitored liquid in the control zone, the velocity of the wave's trace along the input surface is set equal to the velocity of the normal wave (Lamb wave), but, in contrast to the first method, a surface wave is at the same time additionally excited, which does not undergo attenuation when the tank wall is damped with liquid in the level control zone; this wave is received by the same acoustic receiver, the received input signal, which comprises both waves, is weakened. The amplitude of the surface wave is identified in it and detected, and a threshold signal is generated, the value of which is memorized, the amplitude of the surface wave is compared with the threshold signal and when it decreases, a periodic sequence of control pulses is generated, the number of which is proportional to the magnitude of the decrease in the amplitude of the surface wave relative to the threshold signal and inversely proportional to the value of the attenuation, which was initially introduced; the pulses are directed to the attenuation circuits of the input signal, and the amplitude of the information normal wave is restored.

The disadvantages of this method of controlling the liquid level, which reduces its reliability and accuracy, include the fact that it uses a surface wave as a reference signal, velocity of which is less than the Lamb wave velocity, which is used as an information wave. As a result, the time zone for receiving the reference signal can coincide with the action of other waves propagating in the wall of the tank, including reflected ones, which reduce the reliability of its signal identification. The second disadvantage is related to the fact that the initial adjustment and start-up of the liquid level control a priori assumes the presence of a good acoustic contact between the emitter and the receiver, and also the relative invariance of the acoustic characteristics of the paths of the surface wave and the Lamb wave, which can not always be observed.

The device implementing this method (RF patent No. 2123172, G 01 F 23/296, 1998) consists of an acoustic emitter and a receiver, each comprising two piezoelectric transducers mounted at different angles on the wave guide to excite surface and normal Lamb waves in the wall. In this case, the acoustic receiver and the emitter are installed directed to each other on the outer surface of the tank along a line parallel to the surface of the monitored liquid at a fixed distance. Besides, the device comprises an electronic unit of signals generation and extraction, the output of which is connected to the transmitter of acoustic signals, and the input to the receiver of acoustic signals. The electronic conditioning unit includes a synchronizer, the output of which is connected to the exciter, the first input of the coincidence circuit, the first and second delay lines. The output of the exciter is connected to a power amplifier, the output of which is the output of the signal conditioning unit and the input is the input of a summarizer, which output is connected to the first input of the attenuator connected by its output through the amplifier with the second inputs of the two selector channels. The first inputs of these selector channels through the respective conditioners are connected to the outputs of the first and second delay lines. The output of the second selector channel through the second peak detector is connected to the measuring channel. The output of the first selector channel through the first peak detector is connected to the first input of the comparator, the second input of which is connected to the reference voltage master. The output of the comparator is connected to the second input of the coincidence circuit, the output of which, through serially connected counter, decoder and analog key block is connected to the second input of the attenuator.

The disadvantages of this device are low reliability and complexity.

The design of the acoustic emitter and receiver, which comprises two piezoelectric transducers, thus forming two paths of signal conditioning by various elements of the acoustic emitter and receiver, requires the identical influence of external factors, in particular, temperature, on the characteristics of these elements, which is practically difficult and leads to distortion of the final signal informing about the position of the monitored liquid level. Insufficient accuracy is also due to the fact that the hysteresis characteristic of the amplitude of the information signal as a function of the position of the liquid level in the control zone closely adjacent to the line on which the acoustic emitter and receiver are located creates an ambiguous relationship between the set point of the amplitude of the information signal and the position of the liquid level in this zone.

Insufficient reliability of the device is due to its complexity. In its structure, there are elements of the auto-gain control circuit of the received acoustic signals, which itself requires preliminary tuning. Moreover, a priori, it is assumed that such a tuning should be performed with good acoustic contact of the emitter and the receiver with the surface of the tank. Actually, additional complicated technical procedures are required to meet this condition.

A liquid level control device is known (RF patent No. 2383869, G01F 23/28) in which the ultrasonic level meter comprises at least one pair of transducers, emitting and receiving, for exciting and receiving, respectively, of an anti-symmetric Lamb wave in the wall of a container partially filled with liquid, these transducers are mounted on an external surface of the tank, as well as a high-frequency generator, and a synchronization unit connected to the registration unit. In this device, the pairs of transducers are arranged horizontally or vertically relative to the position of the level in the container. The acceptable accuracy of measuring the position of the liquid level relative to the installation position of the transducers is achieved by selecting the optimum frequency (f) of the high-frequency generator associated with the thickness (h) of the tank wall by the relation: f=(3-5)h and the acceptable sensitivity of the receiving equipment, which makes it possible to estimate the change in the amplitude (power) of the gated signals of anti-symmetric Lamb waves.

This device has the same drawbacks as the one described above, in which the amplitude method for measuring the attenuation of Lamb waves is used, the accuracy of which depends, in one way or another, on the initial tuning of the measuring channels of the device and the calibration of its measuring scale. Moreover, this patent considers only cases of either vertical or horizontal arrangement of pairs of transducers and measurements are made only on these individual pairs, and the results of measurements obtained from horizontal pairs are not used to increase the accuracy of measurements obtained from vertical pairs by adjusting (graduating) the measuring scale. Also, the accuracy of the measurement will depend on how correct the oscillator frequency is pre-tuned, which is related with the thickness of the tank wall, the magnitude of which is not always known. It is worth also to be noted that the description of the patent comprises references to the fact that different Lamb waves are excited in the plate (tank wall), but the anti-symmetric Lamb waves of zero order (zero mode) are used by time gating as the most informative. However, the use of an anti-symmetric Lamb wave only (and a symmetric one only, too) is affected by destabilizing factors (for example, temperature, etc.) in the process of measurement, which inevitably makes measurements less accurate.

A method for controlling the liquid level is know (RF patent No. 2437066, G 01 F 23/296, 2010)—selected as a prototype. This method is that a normal wave is periodically introduced by means of an ultrasonic radiator into the tank wall in the control zone, which propagates along the wall of the tank. This wave is received by an acoustic receiver installed at a fixed distance from the emitter, using the energy characteristic of this wave as an information signal for determining the position of the liquid level in the control zone with respect to the installed emitter and receiver, the emitter and receiver being located on the outer surface of the tank in such a manner the acoustic signals from the emitter and receiver are entered at right angles to the surface of the wall of the tank, and they are located throughout the height in such a manner that the liquid level control zone is located between them, exciting and receiving, respectively, simultaneously both symmetric and anti-symmetric Lamb waves of zero mode, then the received signals are digitized by means of an analog-digital conversion, the digital sequences relating to symmetric and anti-symmetric Lamb waves of zero mode are identified, the ratio of the energy characteristics of these waves is calculated, then it is compared with a constant predetermined value and a signal is formed, which indicates the position of the liquid level in the control zone corresponding to a predetermined magnitude of the ratio of signal characteristics.

The disadvantage of this method is the need for preliminary calibration of at least the initial and final values of the measuring scale, which presupposes the fixation of these values with a deliberately filled and drained tank to levels beyond the control zone (above and below the sensor installation area), and knowing and taking into account the parameters of the tank wall, which affect the characteristics of the Lamb wave, which, in general, is not always possible. Without the use of additional level control means that allow the calibration scale to be calibrated directly on site, it is not possible to achieve accurate measurements, as well as high speed of their conduct.

The device implementing the method disclosed in the same patent of the Russian Federation No. 2437066, G 01 F 23/296, 2010, comprises an acoustic emitter and an acoustic receiver including piezoelectric transducers mounted on the outer surface of the tank at a fixed distance from each other, a receiving amplifier, a power amplifier, the output of which is connected to an acoustic emitter, a signal conditioning unit, the input of which is connected to the output of the receiving amplifier, and the output to the input of the power amplifier, and the emitter and receiver of acoustic signals are installed in height in such a manner that the liquid level control zone is located between them, each of which comprises one piezoelectric transducer, the installation of which allows to enter acoustic signals at right angle to the tank wall surface to excite simultaneously symmetric and anti-symmetric normal Lamb waves of zero mode, the amplifier input being connected to the output of the acoustic receiver, and the signal conditioning unit is made in the form of a microcontroller.

This device has the following drawbacks. It requires a preliminary adjustment, consisting in the calibration of at least the initial and final values of the measuring scale, as well as establishing the correspondence of the set point value to the monitored position of the liquid level in the tank. Prior to putting the device into operation, this calibration procedure requires at least one full cycle of draining or filling the tank with liquid in such a way that the liquid level passes through the entire established control zone with the fixation of the required level control points by other means, which is not always possible. For example, in the case of an oil tank with a capacity of several thousand tons, a test drain or fill, even a small level for adjusting the scale, will be impossible for technological reasons due to large volumes of pumping, which can be available only under operating conditions. Another example is a waste storage tank of poisonous waste, in which the limit level is controlled and the discharge from which is made once, after reaching the threshold value of this level. The above drawbacks limit the scope of the device and do not provide accurate measurements within a short period of time (i.e., to perform high-speed fine-tuning to get precise measurements).

DISCLOSURE OF THE INVENTION

The general task of the group of inventions and the required technical result achieved with the use of a group of inventions is to increase the accuracy (reliability) of controlling the level of liquid in the tank while increasing the speed of measurements (reducing the time for tuning up accurate measurements, in particular, by auto-calibrating the measuring scale) and expanding the field of application of the proposed group of inventions.

The set task and the required technical result with the use of a group of inventions are achieved by a new method of controlling the liquid level according to the characteristics of Lamb waves, which consists in periodical introducing by an ultrasonic emitter into the wall of the tank a normal wave propagating along the wall of the tank; receiving this wave by an acoustic receiver, which is established at a fixed distance from the emitter; the energy characteristic of this wave is used as an information signal to determine the position of the liquid level in the control zone relative to the installed emitter and receiver, with the emitter and receiver positioned on the outer surface of the reservoir in height in such a manner that the liquid level control zone is located between them, which excite and receive simultaneously both symmetrical and anti-symmetric Lamb waves of zero mode, then the received signals are digitized by means of an analog-to-digital conversion, the digital sequences relating to the symmetric and anti-symmetric Lamb waves of zero mode are identified, the ratio of the energy characteristics of these waves is calculated, they are compared with a constant predetermined value, and a signal is formed, which indicates the position of the liquid level in the control zone corresponding to a predetermined value of the ratio of the signal characteristics; moreover, according to the invention, at least a second pair of receiver/emitter is used, which forms a figure of a quadrangular shape together with the first pair, the horizontal sides of which are parallel to the liquid level; moreover, values of the energy characteristics of the Lamb waves propagating simultaneously between each of the horizontal pairs of the emitter/receiver and the second vertical pair of the emitter/receiver are calculated using the values obtained from at least one of horizontal pairs to determine the initial and final values of the measuring scale of the other pairs, with the help of which the liquid level positions are determined and/or measured in height.

The set task and the required technical result with the use of a group of inventions are also achieved by a new device for controlling the level of liquid in tanks comprising one acoustic receiver and one acoustic emitter, each of which is equipped with a piezoelectric transducer installed at a fixed distance from each other in such a manner that the control zone of the level of the liquid is between them to excite simultaneously symmetric and anti-symmetric normal Lamb waves of zero mode, as well as the signal conditioning unit, while, according to the invention, the device further comprises at least one (second) pair of acoustic receiver/emitter mounted on the surface of the tank in such a way that it forms a quadrangular figure with the first pair, horizontal sides of which are parallel to the level of the liquid.

The input of each of the acoustic emitters is connected to the output of its power amplifier, the input of which is connected to the output of the signal conditioning unit. The output of each of the acoustic receivers is connected to the input of its receiving amplifier, the output of which is connected to the input of the signal conditioning unit.

An essential difference between the proposed group of inventions is the use of the measurement of the energy characteristics (their ratios) of Lamb waves propagated between additional horizontal pairs of emitter/receiver for automatic calibration of the main measuring scale of the vertical pairs of emitter/receiver directly on site, thereby increasing the accuracy of liquid level measurements and simultaneously accelerating the process of calibration of a measuring scale, and also increasing reliability and expanding the scope, by covering those objects, also, where, for technological reasons, it is not possible to perform presetting of the device using trial draining or filling of liquids for initial calibration, with parallel use of other methods, direct or indirect ones, of controlling the liquid level at these facilities, so allowing to expand up to 100% the zone for controlling the liquid level in height for closed vessels (tanks) of an oval or round horizontal cross-section, as well as pipelines.

The proposed group of inventions provides for automatic individual adjustment of the calibration of the measuring scale for each object, which parameters and characteristics have, in general, a nonlinear functional relationship with the measurement characteristic of the proposed method for measuring the liquid level. In particular, the degree of attenuation of Lamb waves and the ratio of their energy characteristics of symmetric and anti-symmetric waves of zero order used to determine the position of the liquid level are affected by the quality of the surface of the tank walls, both external (roughness, protective coating) and internal (contamination with viscous liquid fractions, lamination of deposits, etc.), its thickness and a number of other factors, up to the quality of the contact of the receiver and the emitter with the wall surface. All these factors not known in advance, this is why they cannot be considered in the preliminary bench setup. As practice shows, even settings made on one object can not be applied to another similar one without loss of measurement accuracy. Due to the automatic calibration of the measuring scale, its initial and final points, the initial and final position of the liquid level for the vertical measuring scale is unambiguously associated with the position of the lower and upper horizontal emitter/receiver pairs along the height, which is known and determined when they are installed on the tank wall. The binding of these levels to the values of the energy characteristics of the Lamb waves (their ratios) measured by the vertical emitter/receiver pairs is based on the measurements of the horizontal emitter/receiver pairs. The measured values of the ratio of the energy characteristics of the signals obtained from horizontal pairs, depending on the position of the liquid level relative to the control zone, can be the following: equally (close) low when the liquid level is above the control zone, equally (close) high when the liquid level is below the control zone, and significantly different when the liquid level is in the control zone, between the lower and upper emitter/receiver pairs. In the first case, the values obtained from the horizontal pairs are used to adjust the values measured by the vertical pairs to the lower point, i.e. starting point of the measuring scale, taking into account the difference in distances on which these pairs are located, if any. In the second case, for the top point of the scale. In the third case, immediately for both bottom and top points of the scale. In any case, the calibration process begins immediately, by setting one of the extreme points of the measuring scale and (or) immediately terminated (re-defined) by setting both extreme points of the scale as soon as the liquid level is in the control zone. This point of time is identified automatically by the significant difference in the measured values of the signals received from horizontal pairs, extreme or neighboring ones. In this case, the extreme horizontal pairs are pairs located at the boundaries of the control zone. The horizontal pairs inside the control zone are adjacent (intermediate). Thus, due to automatic calibration of the measuring scale (adjustment of the preset values), the accuracy of the liquid level measurements made by the vertical pairs of the emitter-receiver is increased, which starts immediately, without preliminary draining or filling the liquid in the tank and without the use of other means of control of this level.

EMBODIMENTS OF THE INVENTION

Figure 1:
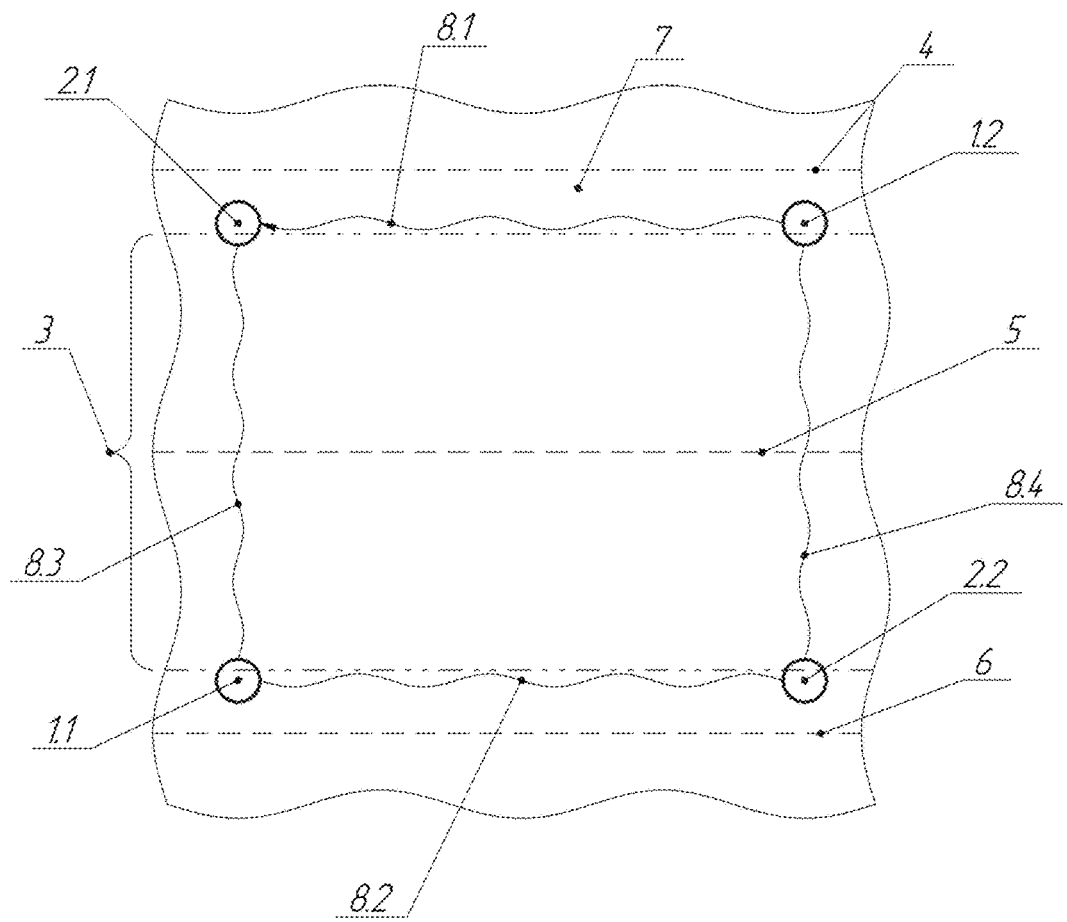
FIG. 1 shows the arrangement diagram of two pairs of acoustic receivers and emitters on a vertical tank wall 7 for a general case. The first acoustic emitter 1.1 and the first acoustic receiver 2.1 forming the first horizontal pair of acoustic transducers are mounted on a line parallel to the liquid level 4, (5, 6) at the lower boundary of the liquid level control zone 3. The second acoustic emitter 1.2 and the second acoustic receiver 2.2 forming a second horizontal pair of acoustic transducers, are also installed on a line parallel to the liquid level 4, (5, 6), at the upper boundary of the liquid level control zone 3. Wavy arrows 8.1 to 8.4 show directions, in which Lamb waves propagate on two horizontal sections 8.1 and 8.2 and two vertical sections 8.3 and 8.4, between acoustic transducers, which control the propagation of Lamb waves. Directions of propagation of Lamb waves can be configured differently from what is shown in FIG. 1 if a receiver and emitter in one of the horizontal pairs are swapped around. In this case, the vertical directions of propagation of Lamb waves will be controlled by diagonal pairs.
Figure 3:
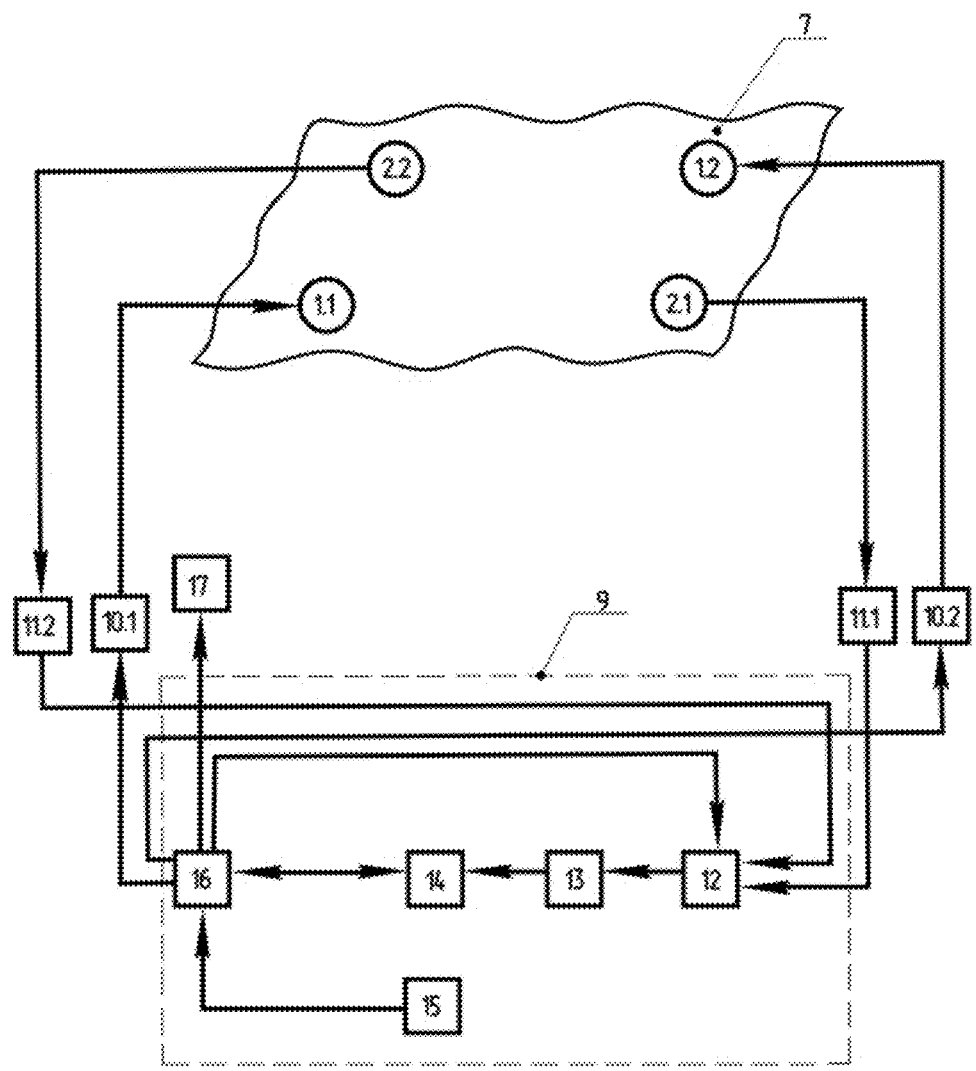
FIG. 3 shows a block diagram of an apparatus for determining the position of a liquid level in a tank. The device consists of two acoustic emitters 1.1, 1.2 and two acoustic receivers 2.1, 2.2, forming four pairs, two horizontally located and two vertically arranged, installed on the outer surface 7 of the tank (reservoir). The acoustic transducers are connected via power amplifiers 10.1, 10.2 and receiving amplifiers 11.1, 11.2, respectively, to the signal conditioning unit 9, which consists of a switch 12, an A/D converter 13, a RAM 14 (random access memory), a ROM 15 (read-only memory), and a CPU 16 (central processing unit), the output of which is connected to an external indicator 17.

The device for control the liquid level in the tanks comprises (FIG. 3) the first acoustic emitter 1.1 and the first acoustic receiver 2.1 fixed to the outer surface 7 of the tank (reservoir), forming the first horizontally arranged pair of acoustic transducers, and the second acoustic emitter 1.2 and the second acoustic receiver 2.2, forming the second horizontally arranged pair of acoustic transducers, each comprising one piezoelectric transducer (not shown in the diagram). In this case, the first and second pairs of acoustic transducers are installed along different lines parallel to each other and liquid level simultaneously, at fixed distances, both horizontally and vertically, forming the first vertically arranged pair consisting of the first acoustic emitter 1.1 and the second acoustic receiver 2.2 and the second vertically arranged pair consisting of the second acoustic transmitter 1.2 and the first acoustic receiver 2.1. The distance between the horizontal pairs of acoustic transducers generally determines the size of the liquid level control zone heightwise, as shown in FIG. 1. The first 1.1 and second 1.2 acoustic emitters are connected to the output of the first 10.1 and second 10.2 power amplifiers, respectively. The first 2.1 and the second 2.2 acoustic receivers are connected to the input of the first 11.1 and the second 11.2 receiving amplifiers of the acoustic signals, respectively. The outputs of the receiving amplifiers and the inputs of the power amplifiers are connected to the corresponding inputs and outputs of the signal conditioning unit 9, which is based on a microcontroller and includes the switch 12 that provides the switching of the signals arriving at the inputs of the signal conditioning unit 9. Through the output of the switch 12, the signals enter the analog-to-digital converter (ADC) 13 that converts them into a digital sequence that is supplied to the RAM 14. The RAM stores the incoming digital sequences in the form of structured data tables, lines of which comprise data relating to the measured values of the signals obtained from the corresponding pairs of acoustic transducers for one full period during which data are received from all the acoustic pairs of the transducers. The data stored in RAM is processed by one of the methods, the algorithms of which are recorded as a program into a read-only memory (ROM) 15 and implemented by a central processor (CPU) 16. The CPU, which is connected by its respective inputs/outputs with RAM and ROM, implements the input digital data processing program, simultaneously generates pulses at the output of the signal conditioning unit 9, controls the switching of the inputs of the switch 12 through the control input connected to it, also produces the necessary computational procedures that determine the current position of the liquid level, and gives this value to the external indicator 17 through the input connected to it.

When using the third and subsequent receiver/emitter pairs connected to their third 11.3 and subsequent 11.4 . . . 11.$n$ receiving amplifiers and power amplifiers 10.3 . . . 10.$n$, respectively, the outputs and inputs of the letters will be connected to the corresponding inputs of the switch 12 and outputs of the CPU 16, respectively (not shown in the drawings). These additional pairs will be located heightwise between the first two pairs along horizontal lines parallel to the liquid level inside the control zone, thereby forming additional vertical pairs and significantly increasing their number. It is assumed that the third and subsequent pairs of transducers will be located inside the control zone formed by the first two ones. Thus, the initial control zone is divided into a larger number of sections. This makes it possible to more accurately approximate the overall nonlinear characteristic of the measuring scale.

Thus, the introduction of the third horizontal pair of acoustic transducers increases the number of possible additional acoustic pairs of transducers from two to six, by means of which it is possible to monitor the position of the liquid level in the inner sections of the common control zone, dividing it into several consecutively both adjacent and intersecting areas and increasing, in this way, the accuracy and reliability of the control.

The universal acoustic transducers can be used as emitter/receiver pairs that combine the functions both of a receiver and an emitter simultaneously (in the drawings such transducers are not shown), thus ensuring the control of the propagation of Lamb waves in both directions between horizontal pairs and between the additionally formed pairs (in this case, vertical or diagonal ones). The use of such universal transducers allows doubling the number of obtained values of the energy characteristics of Lamb waves, which provide an increase in the number of independent measuring scales of the same liquid level, and, on top of that, increase the validity and reliability of control. In the device itself, such universal transducers 1.$i$ will be connected simultaneously to the input of the receiving amplifier 11.$i$ and to the output of the power amplifier 10.$i$, the outputs and inputs of which will be connected to the corresponding inputs of the switch 12 and the outputs of the CPU 16, respectively.

The device for control the liquid level in the tanks operates as follows. The CPU 16 generates a series of periodic pulses that are amplified by the power amplifiers 10.1 and 10.2, then fed to the acoustic emitters 1.1 and 1.2, respectively, which convert them into acoustic signals and they are introduced into the tank wall from the outside. In this case, the design of acoustic transducers provides for the primary excitation in the tank wall of a symmetric and anti-symmetric Lamb wave of zero order, as the most informative for the problem under consideration. Then these waves propagate in different directions along the sections formed by different pairs of acoustic transducers, vertical and horizontal ones. Their signals are then received by the receivers of acoustic signals 2.1 and 2.2, structurally similar to the acoustic emitters that make up the corresponding pairs with them, amplified by the receiving amplifiers 11.1 and 11.2, respectively, and are fed to the inputs of the signal conditioning unit 9.

In the signal conditioning unit 9, which can be implemented as a microcontroller, the signals that income to its inputs, via the switch 12 controlled by the processor 16, are input to the ADC 13, digitized and written to the RAM 14. The data stored in RAM, which refer to the signals obtained from various parts of the surface of the tank formed by all pairs of acoustic transducers, are processed by the CPU 16 according to the program stored in the ROM 15. This program implements the processing algorithm for the received data and calculates the required parameters, including setup, which define an initial calibration of the measuring scale and the current value of the liquid level position in the tank, which is transmitted to an external indicator 17.

For the general case of arrangement of the acoustic transducers shown in FIG. 1, the automatic initial setup procedure and its algorithm are as follows:

With such an arrangement of acoustic transducers and a monotonous preliminary tuning of the parameters of measuring channels formed by horizontal pairs, the position of the liquid level relative to the level control zone is unambiguously determined from the measured values of the energy characteristics (their ratios) of the Lamb waves. The close low values of the measured characteristics obtained from the horizontal pairs of acoustic transducers will correspond to the position of the liquid level 4 (above the control zone). The close high values of the measured characteristics obtained from the horizontal pairs of acoustic transducers will correspond to the position of the liquid level 6 (below the control zone). If the values of the measured energy characteristics of the Lamb waves (their ratios) obtained from the top horizontal pair of acoustic transducers 1.1 and 2.2 significantly (many-fold) exceed the same values obtained from the bottom horizontal pair of acoustic transducers 1.1 and 2.1, then this will mean that the liquid level occupies position 5 (it is located in control zone 3). The opposite relation, when the bottom pair of acoustic transducers shows significantly bigger measured values of energy characteristics (their ratios) than the upper pair of acoustic transducers, this is a sign of unreliability of the measurements and can be an indicator of a malfunction that increases the reliability of measurements. The adjusted position of the liquid level in the control zone 3 will be determined as soon as the liquid level appears in this control zone, goes into this zone during the drain/fill process, or immediately appears in this zone at the moment of installation of the acoustic transducers on the tank wall and start of the measurements. At this moment, the process of automatic calibration of the measuring scale of vertical pairs of acoustic transducers is launched: the left one, formed by the first acoustic emitter 1.1 and the second acoustic receiver 2.2, and the right one formed by the second acoustic emitter 1.2 and the first acoustic receiver 2.1. Initial and final position of the liquid level for the vertical measuring scale is unambiguously associated with the position of the lower and upper horizontal emitter/receiver pairs along the height, which is known and determined when they are installed on the tank wall. The binding of the initial position of the scale level to the values of the energy characteristics of the Lamb waves (their ratios) measured by the vertical emitter/receiver pairs is based on the measurements obtained from the horizontal emitter/receiver pairs, taking into account the correction for the difference in distances between these pairs that are known and determined by the initial installation of the transducers on the tank wall.

The process of initial calibration of the vertical measuring scale is also started for the case when both horizontal pairs are below the actual position of the liquid level. Then the initial position of the vertical scale is associated with the values of the measured energy characteristics of the Lamb wave (their ratio) obtained from one of the horizontal pair, if they are sufficiently close, or the mean value between them is taken, if they differ somewhat. Similarly, for the case where both horizontal pairs are above the actual position of the liquid level, the final position of the vertical scale is associated with the values of the measured energy characteristics of the Lamb wave (their ratio) obtained from one of the horizontal pair, if they are sufficiently close, or the average value is taken between them, if they are somewhat different. Such a preliminary initial setting of one of the points of the measuring vertical scale allows further use of it to more reliably determine the position of the liquid level when it passes into the control zone. Then, when the actual position of the liquid level appears in the control zone and is determined in it by the ratio of the readings of the horizontal pairs of the converters, and also confirmed by the indications, previously calibrated at one point of the vertical measuring scale, then the initial and final positions of the vertical scale are put into correspondence with the values of the measured energy characteristics of the Lamb wave (their ratios) obtained from the bottom and top horizontal pair, respectively. At this point, the calibration of the vertical measuring scale can be considered complete or it can be permanently continued by monitoring and re-defining the calibration points according to the corresponding changes in current measurements of the energy characteristics of Lamb waves propagated between horizontal pairs that are caused by external destabilizing factors that affect vertical pairs in the same manner.

Thus, if in the course of current measurements the external conditions that can affect the transfer characteristics of acoustic transducers change, then they can be automatically compensated by introducing corrections for the values of the end points of the vertical measuring scale, taking into account the changes that are detected by horizontal pairs when the liquid level is inside control zone, thus ensuring the stability of accurate measurements.

The adjusted position of the level of the liquid in the control zone between the initial and final positions of the vertical measuring scale may be indicated separately, along the left or right vertical pair of acoustic transducers, or be calculated as an average. When determining the intermediate values of the liquid level within a calibrated scale, different methods of approximation can be used, taking into account both the nature of the dependence of the damping of the Lamb wave signals on distance and the geometry of the surface of the tank.

Thus, the use of horizontal pairs of transducers for the calibration of the initial and final points of the measuring vertical scale increases the reliability and accuracy of the liquid level measurement while reducing the time for such automatic calibration and extending the scope of this method of control of the liquid level.

Figure 2:
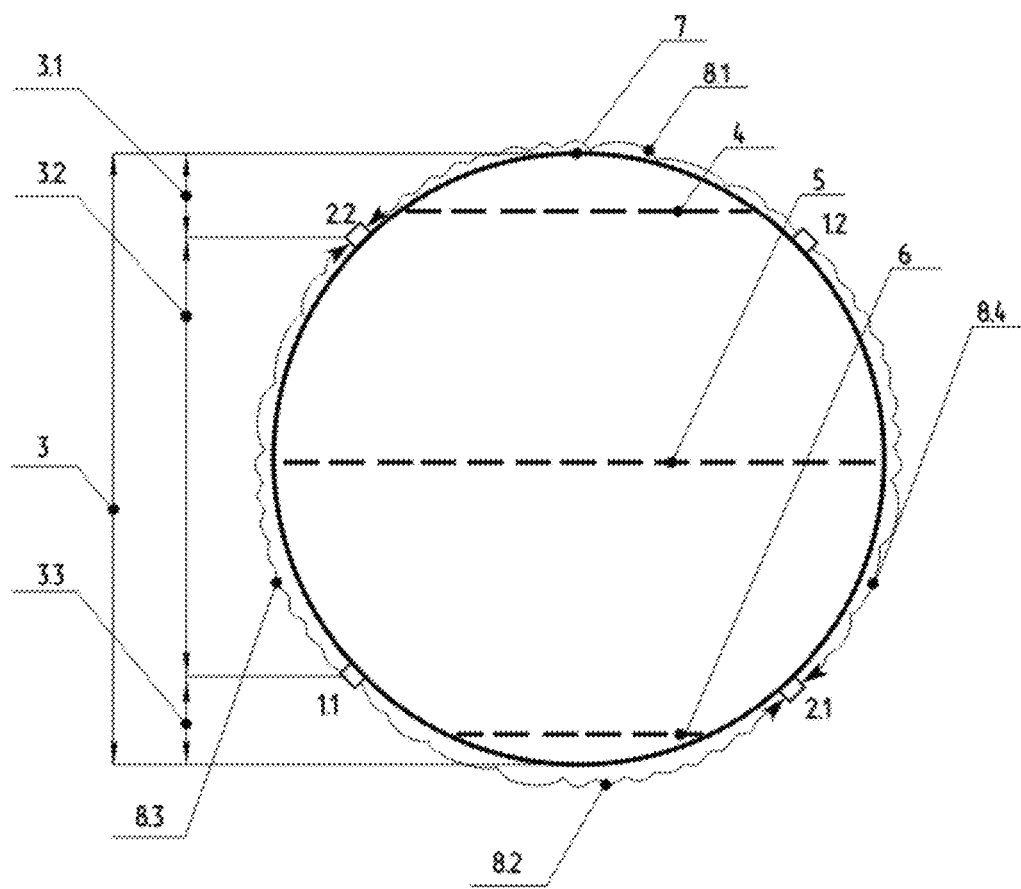
FIG. 2 shows the arrangement diagram of two pairs of acoustic receivers and emitters in the vertical plane of the cross section for closed vessels (reservoirs, pipelines) of a round (oval) horizontal position shape. The first acoustic emitter 1.1 and the first acoustic receiver 2.1 form the first bottom pair of acoustic transducers. The second acoustic emitter 1.2 and the second acoustic receiver 2.2 form the second top pair of acoustic transducers. The first acoustic emitter 1.1 and the second acoustic receiver 2.2 form the first side pair of acoustic transducers. The second acoustic emitter 1.2 and the first acoustic receiver 2.1 form a second side pair of acoustic transducers. All pairs of acoustic transducers are located on the outer closed surface 7 of the vessel (pipeline) in a vertical cross-section symmetrical with respect to the central axes, horizontal and vertical ones. The vertical cross-section may be round or oval (FIG. 2 presents a round shape). The direction of propagation of Lamb waves and the sections between acoustic transducers, over which the values of their signals are controlled, are indicated by wavy arrows 8.1÷8.4.

For the case shown in FIG. 2, the procedure and the algorithm for determining the initial settings has some peculiarities in relation to the general one shown in FIG. 1 and consists in the fact that the size of the control zone of the liquid level 3 is the total height of the tank (reservoir, pipeline), which is divided into three consecutive sections 3.1, 3.2 and 3.3. The peculiarity of the external surface profile of the pipeline is that it is closed, unlike a conventional tank. This feature makes it possible to provide a full height control zone for the pipeline, broken down into three sections, whereas for a conventional tank it is limited by extreme horizontal pairs. Expansion of the height control zone in this case means that it is located not only between vertical pairs, but also between horizontal pairs. At the top, up to the highest point of the pipe section, and at the bottom, to the lowest point. The measurement of the liquid level in the top section 3.1 is provided by the upper pair of acoustic transducers. In the middle section 3.2, the liquid level measurement is provided by the side pairs of acoustic transducers, the first or the second one, if the differences in the indications between them are insignificant, or by two of them, if their indications differ by the amount of an established error. In the latter case, the true measured value can be taken as the arithmetic mean of their readings. Measurement of the liquid level in the lower section 3.3 is provided by the lower pair of acoustic transducers. For each measuring section in height, a separate measuring scale is used, the initial and final values of which are connected with the installation points of acoustic transducers on the outer wall of the tank (reservoir, pipeline) and its dimensions (inner diameter, inner vertical axis of the ellipse).

Automatic binding (graduation) of the start and end points of the measuring scales of each section to the measured values of the energy characteristics (their ratios) of the Lamb waves obtained from the corresponding acoustic pairs of the transducers can be performed depending on the initial position of the liquid level, as follows.

At the first stage, which starts immediately after the measurement starts, the approximate position of the liquid level is determined, referring it to one of the sections of the control zone, to the upper 3.1, middle 3.2, or lower 3.3 one. To solve this problem, it is sufficient to set up the measuring channels of acoustic transducers, which does not require a high accuracy, but provides approximately equal signal conversion characteristics for all acoustic pairs of transducers. This adjustment is sufficient to compare the measured values obtained from all pairs of acoustic transducers, at the initial stage, to determine in which part of the control zone the liquid level is located. In this sense, it is preferable to place acoustic transducers along the closed perimeter of the outer surface of the tank wall (reservoir, pipeline) at an equal distance from each other. Although, the difference in the distances between pairs of acoustic transducers can be taken into account when evaluating their initial readings, by reducing to unit length.

When the liquid level in the control zone (section 3.1) is detected, the readings of the side and bottom pairs of acoustic transducers given to length unit will be equally low. For the upper pair of acoustic transducers, these readings will be higher than the others, or equal (close) to them if the liquid level is at the highest point of the level control zone (the tank is full). In this case, the bottom points of the measuring scales are bound for all sections 8.1÷8.4, according to the values obtained in sections 8.2, 8.3 and 8.4. One of them is selected if they are sufficiently close or their average arithmetic value is calculated if the discrepancy between them exceeds the preset error value.

When the liquid level is in the control zone of section 3.3, the readings of the side and top pairs of acoustic transducers will be equally high. For the lower pair of acoustic transducers, these readings will be lower than the others, or equal (close) to them if the liquid level is at the lowest point of the level control zone (the tank is empty). In this case, the upper points of the measuring scales are bound for all sections 8.1÷8.4, according to the values obtained in sections 8.1, 8.2 and 8.3. One of them is selected if they are sufficiently close or the arithmetic mean of their value is calculated if the discrepancy between them exceeds the preset error value.

When the liquid level is in the control zone, section 3.2, the readings of the upper and lower pairs of acoustic transducers will vary considerably. For side pairs of acoustic transducers, these readings will have readings according to the values close to the readings of the lower or upper pair, or to the average value between them. In this case, the upper points of the measuring scales are bound for all sections 8.1÷8.4 according to the values obtained in section 8.1, and for the lower ones, according to the values obtained in section 8.2.

If, during the initial measurement, other ratios of measured values arise, this indicates that these measurements are not valid and can be used to indicate an error.

Intermediate liquid level values within each section 3.1, 3.2 or 3.3 are determined by approximating their extreme points, taking into account both the dependence of the attenuation of the Lamb wave signals on distance, and the geometry of the external profile of the pipe in the corresponding section.

Thus, the above procedure of initial calibration of the measuring scale for the case shown in FIG. 2 allows to re-define the initial settings at any initial position of the liquid level and ensure accurate measurements throughout the liquid level control zone in the tank (reservoir, pipeline). In this case, this procedure can be performed not only at the initial stage, but at subsequent current measurements, when the position of the liquid level changes, bringing, in such a way, the settings of the measuring scales closer to more accurate values.

In the foregoing, a method has been described in detail for controlling a liquid level judging on the characteristics of the propagation of Lamb waves in the walls of closed tanks under pressure or without over-pressure, and also in open tanks, which ensures that the measuring scale is calibrated directly on the site without the use of other additional measuring means, which can be started from any initial current position of the liquid level relative to the control zone determined by the installation of ultrasonic emitters and receivers on the wall of the tank and completes as soon as this level gets in the control zone.

Also, an ultrasonic liquid level control device has been described in detail, which increases the speed of liquid level control in open tanks and closed vessels by automating the calibration process for the initial and final values of the measuring scale, as well as intermediate ones. The control process can begin immediately after the installation of receivers and emitters of the device on the walls of the vessel or tank automatically, without first loading or draining these reservoirs.

The proposed group of inventions allows automatic calibration of the measuring scale directly on the object even in such cases where, for technological reasons, this cannot be done with the use of other level measuring instruments applying direct or indirect method, thereby increasing the accuracy (overall reliability) of control, accelerating the calibration of the level measurement in the tank, and expanding the scope of use. Thus, the combination of all the above features of the device and the method of liquid level control, respectively, allows solving the set general technical problem and achieving the desired overall technical result.

Although the proposed group of inventions has been described in detail on examples of options that seem preferable, one should keep in mind that these examples of implementation of the invention are given only for the purpose of illustrating the group of inventions. This description should not be considered as limiting the scope of a group of inventions, since in the steps of the methods and devices described by those skilled in the field of physics, electronics, signal processing, etc., changes, which do not go beyond the scope of the attached formula of the group of inventions, may be made to adapt them to specific devices or situations. Those skilled in the art will understand that within the scope of the group of inventions as defined by the Claims, various variations and modifications are possible, including equivalent solutions.

The invention claimed is:

1. A method for control of the liquid level on the basis of the characteristics of Lamb waves, which consists in
that a normal wave is periodically introduced into the wall of the tank by means of an ultrasonic emitter, which propagates along the wall of the tank in a control zone, and said wave is received by an acoustic receiver installed at a fixed distance from an emitter;
then characteristics of this wave are used as an information signal for determining the position of the liquid level in the control zone relative to the installed emitter and receiver,
wherein the emitter and the receiver being located on the outer surface of the tank, but acoustic signals are entered by the emitter and the receiver at right angles to the surface of the tank wall and they are arranged in a height in such a manner that the liquid level control zone is between them, and wherein said emitter and said receiver excite and receive a symmetrical simultaneously symmetric and anti-symmetric Lamb wave of the zero mode;
then received signals are digitized by means of an analog-digital conversion; the digital sequences relating to symmetric and anti-symmetric Lamb waves of zero mode are identified, the ratio of the energy characteristics of these waves is calculated and compared them with a constant predetermined value;
and signals that indicates the position of the liquid level in the control zone corresponding to a predetermined value of the ratio of the signal characteristics is formed;
wherein said method is additionally characterized in that at least a second pair of receiver-emitter is additionally used, which forms a figure of quadrangular shape with the first pair, the horizontal sides of which are parallel to the liquid level, in addition the values of the energy characteristics of the Lamb waves propagated both between each of the horizontal emitter/receiver pairs and the second vertical emitter/receiver pair are computed, using values obtained from at least one of the horizontal pairs to determine the initial and final values of the measuring scale of the other pairs, by means of which the position of the liquid level along the height is determined and/or measured.

2. A device for control of the level of liquid in tanks according to claim 1, comprising at least one acoustic receiver and at least one acoustic emitter, each of which is provided with a piezoelectric transducer, mounted at right angle to the wall surface of the acoustic reservoir of acoustic signals for excitation of simultaneously symmetric and anti-symmetric normal Lamb waves of zero mode at a fixed distance from each other so that the liquid level control zone is between them, and also, a signal conditioning unit, characterized in that it further comprises at least one (second) pair of acoustic receiver/emitter transducers mounted on the surface of the tank in such a way that it forms a figure of quadrangular shape with the first pair, with horizontal sides being parallel to the level of the liquid.

3. A device according to claim 2, characterized in that the input of each of the acoustic emitters is connected to the output of its power amplifier, the input of which is connected to the output of the signal conditioning unit.

4. A device according to claim 2, characterized in that the output of each of the acoustic receivers is connected to the input of its receiving amplifier, the output of which is connected to the input of the signal conditioning unit.

* * * * *